United States Patent
Viviani (10) Patent No.: US 9,373,051 B2
(45) Date of Patent: Jun. 21, 2016

(54) STATISTICAL APPROACH TO IDENTIFYING AND TRACKING TARGETS WITHIN CAPTURED IMAGE DATA

(71) Applicant: Insitu, Inc., Bingen, WA (US)

(72) Inventor: Gary Lee Viviani, Lyle, WA (US)

(73) Assignee: Insitu, Inc., Bingen, WA (US)

( * ) Notice: Subject to any disclaimer, the term of this patent is extended or adjusted under 35 U.S.C. 154(b) by 221 days.

(21) Appl. No.: 13/800,223

(22) Filed: Mar. 13, 2013

(65) Prior Publication Data

US 2016/0098612 A1    Apr. 7, 2016

Related U.S. Application Data

(60) Provisional application No. 61/659,935, filed on Jun. 14, 2012.

(51) Int. Cl.
| | |
|---|---|
| *G06K 9/00* | (2006.01) |
| *G06K 9/32* | (2006.01) |
| *G06T 1/20* | (2006.01) |
| *G06T 7/40* | (2006.01) |
| *G06T 7/20* | (2006.01) |
| *G06K 9/46* | (2006.01) |
| *H04N 5/33* | (2006.01) |

(52) U.S. Cl.
CPC ............ *G06K 9/3241* (2013.01); *G06K 9/4652* (2013.01); *G06T 1/20* (2013.01); *G06T 7/206* (2013.01); *G06T 7/408* (2013.01); *H04N 5/33* (2013.01); *G06T 2207/20056* (2013.01); *G06T 2207/30241* (2013.01)

(58) Field of Classification Search
USPC .......................... 382/218, 190, 195, 209, 197
See application file for complete search history.

(56) References Cited

U.S. PATENT DOCUMENTS

| | | | | |
|---|---|---|---|---|
| 5,267,329 A | * | 11/1993 | Ulich et al. | 382/103 |
| 6,079,665 A | * | 6/2000 | Nella et al. | 244/3.17 |
| 6,408,429 B1 | | 6/2002 | Marrion, Jr. et al. | |
| 6,889,113 B2 | | 5/2005 | Tasker et al. | |
| 7,095,878 B1 | * | 8/2006 | Taylor et al. | 382/118 |

(Continued)

FOREIGN PATENT DOCUMENTS

WO    WO-2008153597 A1    12/2008

OTHER PUBLICATIONS

Ren, Hsuan. Chein-I, Chang. "Automatic Spectral Target Recognition in Hyperspectral Imagery" IEEE Transaction on Aerospace and Electronic Systems. vol. 39. No. 4, Oct. 2003.*

(Continued)

*Primary Examiner* — Kim Vu
*Assistant Examiner* — Molly Delaney
(74) *Attorney, Agent, or Firm* — Perkins Coie LLP (57) ABSTRACT

A facility implementing systems and/or methods for creating statistically significant signatures for targets of interest and using those signatures to identify and locate targets of interest within image data, such as an array of pixels, captured still images, video data, etc., is described. Embodiments of the facility generate statistically significant signatures based at least in part on series approximations (e.g., Fourier Series, Gram-Charlier Series) of image data. The disclosed techniques allow for a high degree of confidence in identifying and tracking targets of interest within visual data and are highly tolerant of translation and rotation in identifying objects using the statistically significant signatures.

22 Claims, 5 Drawing Sheets

(56) References Cited

U.S. PATENT DOCUMENTS

| | | | |
|---|---|---|---|
| 7,426,317 B2 | 9/2008 | Nielsen | |
| 7,620,204 B2* | 11/2009 | Porikli et al. | 382/103 |
| 7,636,452 B2* | 12/2009 | Kamon | 382/103 |
| 7,929,730 B2* | 4/2011 | Huang et al. | 382/103 |
| 7,970,532 B2 | 6/2011 | Tehan et al. | |
| 8,139,863 B1 | 3/2012 | Hsu | |
| 8,620,093 B2* | 12/2013 | Nguyen et al. | 382/218 |
| 8,810,648 B2* | 8/2014 | Bibby et al. | 348/135 |
| 8,810,650 B1* | 8/2014 | Neumann | 348/142 |
| 2004/0170330 A1 | 9/2004 | Fogg | |
| 2006/0285723 A1* | 12/2006 | Morellas et al. | 382/103 |
| 2007/0080851 A1 | 4/2007 | Shapira | |
| 2008/0060034 A1 | 3/2008 | Egnal et al. | |
| 2010/0288910 A1 | 11/2010 | Robinson et al. | |
| 2011/0007962 A1 | 1/2011 | Johnson et al. | |
| 2011/0145256 A1 | 6/2011 | Dunkel et al. | |
| 2011/0298650 A1 | 12/2011 | Yapa et al. | |
| 2012/0019522 A1 | 1/2012 | Lawrence et al. | |
| 2012/0045134 A1* | 2/2012 | Perronnin et al. | 382/197 |
| 2012/0189207 A1* | 7/2012 | Doretto et al. | 382/190 |
| 2012/0200703 A1 | 8/2012 | Nadir et al. | |
| 2013/0077877 A1 | 3/2013 | Uchiyama | |
| 2013/0232419 A1 | 9/2013 | Yates et al. | |
| 2014/0267723 A1 | 9/2014 | Davidson et al. | |

OTHER PUBLICATIONS

Comaniciu, Dorin, Ramish, Visvanathan, Meer, Peter. "Kernel-Based Object Tracking" IEEE Transactions on Pattern Analysis and Machine Intelligence. vol. 25. May 2003.*

Bowers, Newton L Jr. "Expansion of Probability Density Functions As a Sum of Gamma Densities With Application in Risk Theory". Transactions of Soceity of Actuaries vol. 18 Pt 1 No. 52. 1966.*

Berberan-Santos, Mario N. "Expressing a probability density function in terms of another PDF: A generalized Gram-Charlier expansion". Journal of Mathematical Chemistry. vol. 42 No. 3. Oct. 2007.*

G. Viviani and T. Heydt, "Stochastic Optimal Energy Dispatch," IEEE Transactions on Power Apparatus and Systems, vol. PAS-100, No. 7, Jul. 1981, 8 pages.

International Search Report and Written Opinion for International Application No. PCT/US13/45463, Applicant: Insitu, Inc., mailed Mar. 28, 2014, 9 pages.

Bartelsen et al., "Orientation of Image Sequences Acquired from UAVS and with GPS Cameras," Institute of Applied Computer Science, Bundeswehr University of Munich, Neubiberg, Germany, Sep. 1, 2010, 6 pages.

Calhoun et al., "Synthetic vision system of improving unmanned aerial vehicle operator situation awareness," Proc. SPIE vol. 5802, Enhanced and Synthetic Vision, 2005, 13 pages.

Campion et al., "Direct Geo-Referencing Technique for Rapid Positioning of Targets and Environmental Products Using Tactical Grade Airborne Imaging Data," Oceans 2002 Conference and Exhibition Conference Proceedings, 2002, 6 pages.

Cooper et al., "Towards Combining UAV and Sensor Operator Roles in UAV-Enabled Visual Search," HRI'08, Amsterdam, The Netherlands, Mar. 12-15, 2008, 8 pages.

Inanc et al., "Nonlinear Trajectory Generation for Unmanned Air Vehicles with Multiple Radars," 43rd IEEE Conference on Decision and Control, Dec. 14-17, 2004, 6 pages.

Nebiker, Stephen, "Combining micro UAV based mobile video imagery and virtual globes—a test case for future sensor web capabilities," EuroSDR & ISPRS Workshop on Geosensor Networks, Hannover, Feb. 20-22, 2008, 34 pages.

Owens et al., "Using Immersive 3D Terrain Models for Fusion of UAV Surveillance Imagery," American Institute of Aeronautics and Astronautics, Jul. 2009, 10 pages.

Sward et al., A Situational Awareness Tool for Unmanned Aerial Vehicles (UAVs), Institute for Information Technology Applications, United States Air Force Academy, Colorado, Aug. 2005, 9 pages.

Wu et al., "Vison-based Auxiliary Navigation Method using Augmented Reality for Unmanned Aerial Vehicles," Industrial Informatics (INDIN), 10th IEEE International Conference, 2012, 6 pages.

European Search Report for European Patent Application No. 13837710.6, Applicant: Insitu, Inc., Jan. 15, 2016, 9 pages.

* cited by examiner

STATISTICAL APPROACH TO IDENTIFYING AND TRACKING TARGETS WITHIN CAPTURED IMAGE DATA

CROSS-REFERENCE TO RELATED APPLICATIONS

The present application claims priority to U.S. Provisional Application No. 61/659,935, filed on Jun. 14, 2012, which is herein incorporated by reference in its entirety. To the extent that the foregoing application and/or any other materials incorporated herein by reference conflict with the present disclosure, the present disclosure controls.

TECHNICAL FIELD

The described technology relates to generating signatures for objects of interest and using those signatures to identify and track objects within visual data, such as images and/or video sequences.

BACKGROUND

Object recognition and tracking systems are a valuable resource for a variety of different industries. For example, recognition and/or tracking systems may be used to track groups of animals in the wild, to recognize components or sub-assemblies in a manufacturing context, to track motor vehicles, and so on. Object recognition techniques typically rely on insufficient data or unreliable analysis for recognition purposes, such as edges, blobs, centroids, cross-correlation, etc. These techniques, however, do not offer a way to reliably generate statistically significant signatures for detecting objects across a number of image frames or other visual data.

DETAILED DESCRIPTION

A facility implementing systems and/or methods for creating statistically significant signatures for targets of interest and using those signatures to identify and locate targets of interest within image data, such as an array of pixels, captured still images, video data, etc., is described. Embodiments of the facility generate statistically significant signatures based at least in part on series approximations (e.g., Fourier Series, Gram-Charlier Series) of image data. As used herein, "based on" generally refers to "based at least in part on." In some embodiments, "based on" may refer to "based solely on." By creating statistically significant signatures, the disclosed techniques allow for a high degree of confidence in identifying and tracking targets of interest within visual data. The identification and tracking techniques disclosed herein are highly tolerant of translation and rotation in identifying objects using the statistically significant signatures. Accordingly, the facility can establish a target lock on a target of interest and maintain the target lock as the image capture device moves or rotates relative to the target of interest. The generated signatures also allow the facility to identify when a target lock has been lost, such as losses due to occlusion or other perturbations, and to positively confirm reacquisition of a target lock. The techniques disclosed herein can be used to process image data captured from one or more image capture devices, such as a visible light camera (color or monochromatic), a thermographic or infrared (IR) camera, electro-optical camera, ultraviolet (UV) camera, etc. Moreover, the disclosed techniques can be used to track a target of interest in real-time, to track a target of interest in previously-captured image data by, for example, a remote image capturing device or another image capturing device.

In some embodiments, the facility generates a signature for a target of interest by first receiving, from a user, a selection of the portion of an image containing the target of interest. For example, a user may wish to identify an improvised explosive device or track a vehicle using one or more cameras affixed to an aircraft flying overhead or a stationary object. Using a display device and input device (e.g., a mouse), the user can select the vehicle in the captured image data by highlighting the vehicle within one or more captured images by, for example, drawing a box or other shape around the vehicle in the captured image data. For each pixel in the selected portion of the image, the facility may determine at least one characteristic value (e.g., an intensity value) to create a sample set of characteristic values. If the image data were captured by a monochromatic or infrared camera, for example, the facility may determine a single intensity value for each pixel. This set of intensity values may be represented, for example, by a vector (a group of one or more values and/or sub-vectors) $\vec{x}_{IR}$, comprised of one intensity value for each pixel. As another example, if the image data are color image data the facility may determine separate intensity values for each color channel (e.g., red, green, and blue (RGB) or cyan, magenta, yellow, and black (CMYK)). This set of intensity values may be represented, for example, by $\vec{X}_3 = (\vec{x}_{red}, \vec{x}_{green}, \vec{x}_{blue})$, where each of sub-vectors $\vec{x}_{red}, \vec{x}_{green}, \vec{x}_{blue}$ are comprised of one intensity value for each pixel. In some cases, the facility may use input from multiple sensors or cameras for a particular scene, such as input from an infrared camera in combination with input from a black and white camera or color camera. This set of intensity values may be represented, for example, by $\vec{X}_4 = \vec{x}_{red}, \vec{x}_{green}, \vec{x}_{blue}, \vec{x}_{IR})$, where each of sub-vectors $\vec{x}_{red}, \vec{x}_{green}, \vec{x}_{blue}$ and $\vec{x}_{IR}$ are comprised of one intensity value for each pixel. For example, for an image that is 500 pixels wide by 500 pixels high (250,000 total pixels) $\vec{X}_4$ would include 1,000,000 intensity values, each of $\vec{x}_{red}, \vec{x}_{green}, \vec{x}_{blue}$ and $\vec{x}_{IR}$ including 250,000 intensity values. In some cases, the facility may normalize the intensity values based at least in part on, for example, one or more means and standard deviations associated with the intensity values. Where multiple image capturing devices or sensors are employed, target detection and tracking may be improved by aligning the image capturing devices or configuring the image capturing devices to maintain a consistent (or near consistent) detection bias.

In some embodiments, the facility uses the intensity values to generate a series approximation (i.e., a sequence of terms) to a probability distribution function representative of the determined intensity values. The probability distribution function represents a histogram corresponding to the distribution of intensity values within the image data. The probability distribution function plots, for each intensity value, the number of pixels having that intensity value. Because different targets of interest are likely to have different probability distribution functions, the probability distribution functions, and their approximations, can be used to identify the targets of interest within visual data. Moreover, because rotation and translation do not alter the pixel intensity values, the probability distribution functions (and their approximations) can be used to identify a target of interest regardless of image rotation or position within the image data. In some cases, the facility may use multiple probability distribution function approximations for a target of interest, such as one probability distribution function approximation generated for data captured via an IR sensor, one probability distribution function approximation generated for data captured via a red channel of a visible light sensor, one probability distribution function approximation generated for data captured via a blue channel of a visible light sensor, and one probability distribution function approximation generated for data captured via a green channel of a visible light sensor.

In some embodiments, the facility uses a multivariate Gram-Charlier series to generate an approximation to a probability distribution function representative of the determined intensity values. The multivariate Gram-Charlier series can be generated in accordance with the following:

$$f(\vec{X}_n) = \sum_{s_1=o}^{\infty} \cdots \sum_{s_n=o}^{\infty} \left( E\left[\prod_{i=1}^{n} H_{s_i}(\vec{x}_i)\right] \prod_{p=1}^{n} \frac{[H_{s_p}(\vec{x}_p) \bullet G(\vec{x}_p)]}{s_p!} \right).$$

The terms used in the formula above are defined as follows:
n represents the number of intensity values determined for each pixel (e.g., the number of available sensors and/or sensor channels),
$\vec{X}_n$ represents a vector of the determined intensity values, and is comprised of n sub-vectors ($\vec{x}_1, \vec{x}_2, \ldots, \vec{x}_n$), each sub-vector representing a separate set of determined intensity values (e.g., intensity values for each sensor or sensor channel),
E[ ] represents the Expected Value operator as applied to a given set of values (e.g., $$\left(e.g., \prod_{i=1}^{n} H_{s_i}(\vec{x}_i)\right),$$

$$G(t) = \frac{1}{\sqrt{2\pi}} e^{-\frac{t^2}{2}},$$

and
$H_j$ represents the $j^{th}$ Hermite polynomial.
The Hermite polynomials are known in the art and are defined by the equation:

$$H_j(x) = (-1)^j e^{x^2/2} \frac{d^j}{dx^j} e^{-x^2/2},$$

such that
$H_0(x)=1$
$H_1(x)=x$
$H_2(x)=x^2-1$
$H_3(x)=x^3-3x$
$H_4(x)=x^4-10x^2+3$
$H_5(X)=x^5-10x^3+15x$, and so on.

In some embodiments, the facility generates a truncated series approximation of a probability distribution function using a truncated version of the multivariate Gram-Charlier series. The truncated series approximation can be generated in accordance with the following:

$$f_k(\vec{X}_n) \approx \sum_{s_1=o}^{k} \cdots \sum_{s_n=o}^{k} \left( E\left[\prod_{i=1}^{n} H_{s_i}(\vec{x}_i)\right] \prod_{p=1}^{n} \frac{[H_{s_p}(\vec{x}_p) \bullet G(\vec{x}_p)]}{s_p!} \right),$$

where k represents the number of summations performed for each of the n sets of data. The value of k can be established by, for example, a user or the facility based at least in part on available resources. One skilled in the art will recognize that as k increases both the precision of the series approximation and the load on processing resources will increase. In other words, an increase in k will provide a more accurate series approximation but will also increase processing time. For each of the n sets of data, the truncated multivariate Gram-Charlier series produces k coefficients or terms of the truncated series approximation.

Although the use of the multivariate Gram-Charlier series to generate a series approximation for a probability distribution function is described herein, one skilled in the art will recognize that other series can be used to generate an approximation. For example, a curve can be fit to a histogram representative of a probability distribution for the determined intensity values and decomposed using, for example, a Fourier or Hartley transform to generate a series of coefficients or terms. As with the multivariate Gram-Charlier series, the set of coefficients or terms of the series produced by applying a transform can be used as a set of constituent values for a signature for a target of interest.

In some embodiments, the generated set of coefficients or terms serves as the signature for the target of interest. In some cases, however, the facility may further process these coefficients and/or combine the coefficients with additional information to create a signature. For example, the facility may apply vector norms to the coefficients, such as the $L^p$-norm vector norms where, $$L^p(\vec{y}) = \left(\sum_j |y_j|^p\right)^{\frac{1}{p}},$$

p>o, $\vec{y}$ represents a vector comprised of j values, and $y_j$ represents the $j^{th}$ value of $\vec{y}$. As another example, the facility may include as part of the signature additional information about the relevant pixels, such as the mean (e.g., arithmetic or geometric), mode, median, variance, standard deviation, sum, a checksum, and so on. As an example, the signature $\vec{S}_{TOI}$ for a target of interest may be represented by:

$$[(L^1(\text{coeff}(f_k(\vec{X}_n)))+L^2(\text{coeff}(f_k(\vec{X}_n)))), E[\vec{X}_n], (E[\vec{X}_n^2]-(E[\vec{X}_n])^2)]$$

$$\vec{S}=[(L^1\{f(\text{coeff}(\vec{X}_{norm}))\}+L^2\{f(\text{coeff}(\vec{X}_{norm}))\}), E[\vec{X}], E[\vec{X}^2]-(E[\vec{X}])^2],$$

where $\vec{X}_n = (\vec{x}_1, \vec{x}_2, \ldots, \vec{x}_n)$ and $\text{coeff}(f_k\vec{X}_n)$ resents the collection of coefficients or terms produced by the series approximations $f_k(\vec{X}_n)$. In this example, the signature for the target of interest is a vector comprised of three constituent sets of intensity values: 1) the sum of two vector norms ($L^1$ and $L^2$) applied to the series coefficients or terms generated by $f_k(\vec{X}_n)$, 2) the expected value or mean for each of n sets of intensity values (i.e., one set for each sensor or sensor channel), and 3) the variance for each of the n sets of intensity values. As another example, the signature $\vec{S}_{TOI}$ for a target of interest may be represented by:

$$\sum \text{coeff}(f_k(\vec{X}_n)) + E[\vec{X}] + \sqrt{E[\vec{X}^2]-(E[\vec{X}])^2}.$$

In this example, the signature for the target of interest is a scalar comprised of the sum of 1) the generated coefficients or terms, 2) the expected value or mean of the intensity values, and 3) the standard deviation of the intensity values. As another example, the signature $\vec{S}_{TOI}$ for a target of interest may be represented simply by the generated set of coefficients or terms (i.e., $\text{coeff}(f_k(\vec{X}_n))$). One skilled in the art will recognize that the signature $\vec{S}_{TOI}$ may be comprised of any suitable number of values or combination thereof related to the relevant pixel data. Moreover, the facility may generate and store multiple signatures for a single target of interest using, for example, image data captured via different sensors, different sensor channels, or combinations thereof, different combinations of constituent terms, image data captured under various lighting and/or weather conditions, different times of day and/or times of the year (e.g., to account for the changing position of the sun), image data captured using different virtual ranges, and so on. In this manner, the facility can generate and/or use a library of signatures for targets under different circumstances.

In some embodiments, the facility stores additional information in association with each signature, such as the length and width of the selected set of pixels used for generating the signature and/or an indication of a "virtual range" based at least in part on the distance or range between the camera and the target of interest, the focal length or optical zoom setting of the image capture device, and a digital zoom setting of the image capture device. The virtual range provides an indication of the area covered by at least some of the pixels in the captured images. The facility can use the "virtual range" during subsequent image capture and/or processing to test whether pixels that make up the target of interest and/or surrounding area represent approximately the same area of the target of interest and/or surrounding area and adjust the area corresponding to each pixel by, for example, zooming in or out (optically or digitally) and/or repositioning the image capture device relative to potential targets of interest (e.g., moving closer to or further from the target of interest).

After a signature $\vec{S}_{TOI}$ has been generated for a target of interest, the facility may store the signature for use in identifying the target of interest in subsequent images. To identify the target of interest in subsequent images, the facility generates comparison signatures for various portions of the subsequent images using the same technique and constituent terms that were used to generate $\vec{S}_{TOI}$. For example, if the signature for the target of interest was generated using a 300 pixel by 300 pixel patch of pixels, comparison signatures may be generated from 300 pixel by 300 pixel patches of subsequent images. In some cases, the facility may generate signatures for every 300 pixel by 300 pixel patch of pixels within a subsequent image. Alternatively, to conserve resources, the facility may select specific 300 pixel by 300 pixel patches (or different dimensions) of an image based at least in part on, for example, the location of the target of interest in a previous image. After the patches are selected, comparison signatures are generated for each patch using the probability distribution function series approximation techniques described above. In other words, for each of the selected patches of pixels, the facility generates series approximations and uses the series coefficients or terms, alone or in combination with additional information about the relevant pixels, to generate a set of comparison signatures $\vec{S}_{COMP}$. The facility compares each of the comparison signatures to the signature for the target of interest and identifies the patch with the closest or most similar signature as the patch containing the target of interest. The signatures can be compared based at least in part on, for example, the difference or distance between the two signatures. In this manner, the facility can identify a target of interest within subsequent images based at least in part on the captured pixel intensity values and the series approximations. If the target of interest is identified in a subsequent image, the facility may adjust an image capture device to re-center the target of interest within the field of view before processing additional image data. Although a 300×300 pixel-sized patch is described above as an example, one skilled in the art will recognize that a patch may be of any suitable size and shape, such as a circle, rectangle, triangle, irregular polygon or other irregular shape.

Figure 1:
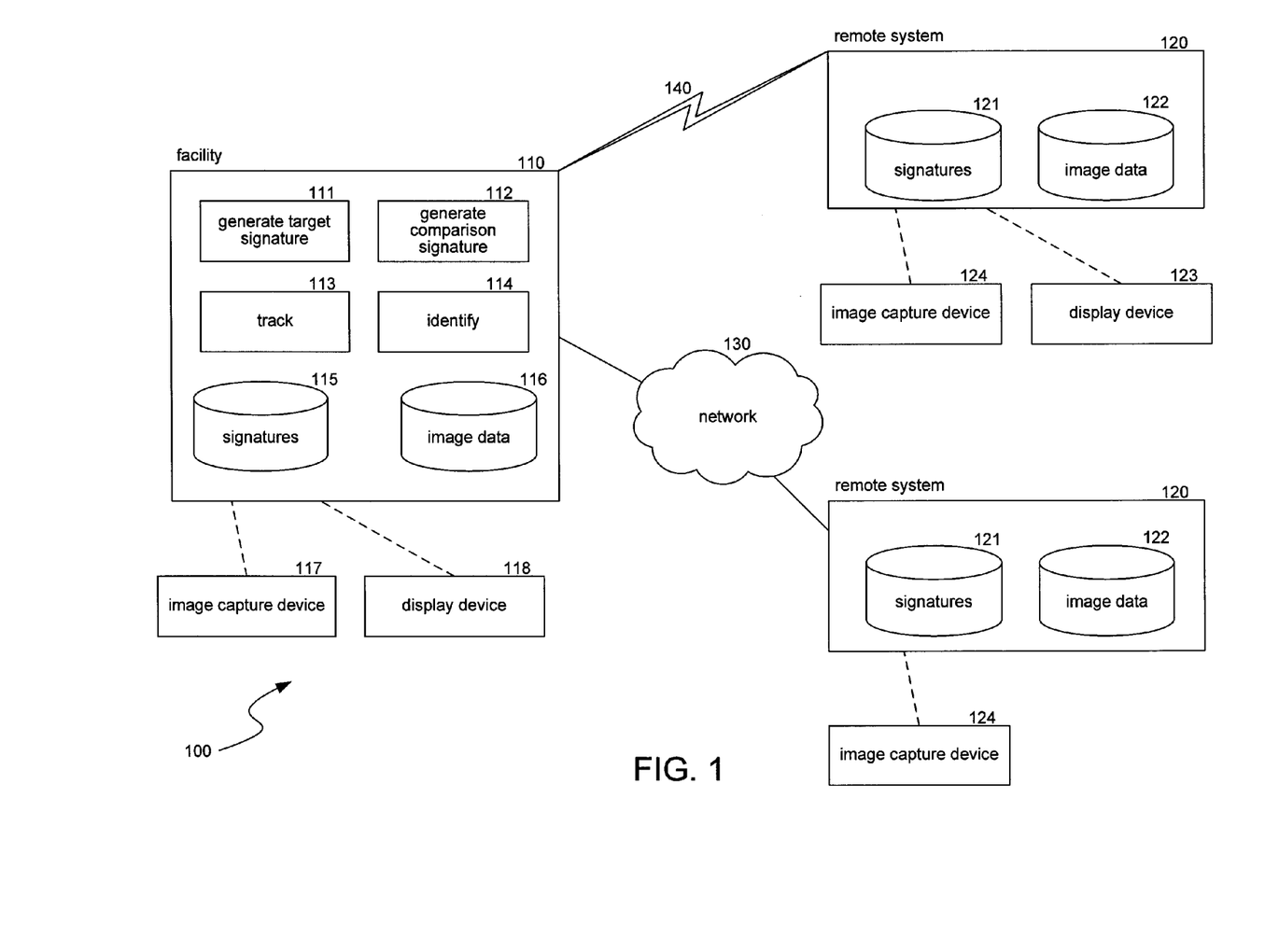
FIG. 1 is a block diagram illustrating an environment in which a facility in accordance with an embodiment of the disclosed technology may operate.

FIG. 1 is a block diagram illustrating an environment in which a facility in accordance with an embodiment of the disclosed technology may operate. In this example, the environment 100 comprises the facility 110, remote systems 120, and a network 130. The facility 110 is comprised of a generate target signature component 111, a generate comparison signature component 112, a track component 113, an identify component 114, a signature store 115, an image data store 116, one or more image capture devices 117, and one or more display devices 118. The generate target signature component 111 is invoked to generate a signature for a target of interest. The generate comparison signature component 112 is invoked to generate a comparison signature for a patch of pixels within image data. The track component 113 is invoked to track a target of interest within image data, such as a sequence of video frames. The identify component 114 is invoked to identify a target of interest within image data. The signature store 115 stores signatures for targets of interest and related data, such as the type and number of sensors and/or sensor channels that were used to generate the signature, the time of day during which the image data used to generate the signature was captured, the weather conditions present when the signature was generated, the virtual range employed when the image data used to generate the signature for the target of interest was captured, information about the area surrounding the target of interest (e.g., snowfield, desert, forested, water, metropolitan, crop fields), the dimensions of the patch used to generate the signature for the target of interest, and so on. The image data store 116 stores captured images, such as images captured from image capture device 117 or images received from another source, such as the remote systems 120. The image capture device 117 is used to capture images for processing and may include multiple sensors (e.g., digital, optical, visible light, infrared, ultraviolet) and/or sensor channels (e.g., red, green, blue). The display device 118 displays image data, such as image data displayed to a user who provides a selection of a target of interest or video of a target of interest.

The remote systems 120 can include a signature store 121, an image data store 122, one or more display devices 123, and one or more image capture devices 124, generally similar to corresponding elements of the facility 110. In some embodiments, the facility may retrieve signatures from a remote system 120 and use these signatures to identify and track targets of interest in images captured by image capture device 117 or another image capture device. Similarly, the facility may identify targets of interest in image data retrieved from a remote system 120, such as a surveillance system with limited processing capabilities, and highlight targets of interest within the image data by, for example, drawing or superimposing a colored box around the targets of interest. In some embodiments, the facility may communicate with a remote system 120 via the network 130 or directly via wired or wireless communication connection 140 (e.g., radio frequency, WiFi, bluetooth).

The computing devices on which the disclosed systems are implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the technology, e.g., a computer-readable medium that contains the instructions. In addition, the instructions, data structures, and message structures may be stored or transmitted via a data transmission medium, such as a signal on a communications link and may be encrypted. Non-transitory computer-readable media include tangible media such as storage media, hard drives, CD-ROMs, DVD-ROMs, and memories such as ROM, RAM, and Compact Flash memories that can store instructions. Signals on a carrier wave such as an optical or electrical carrier wave are examples of transitory computer-readable media. Various communications links may be used, such as the Internet, a local area network, a wide area network, a point-to-point dial-up connection, a cell phone network, and so on.

The disclosed systems may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Many embodiments of the technology described herein may take the form of computer-executable instructions, including routines executed by a programmable computer. Those skilled in the relevant art will appreciate that aspects of the technology can be practiced on computer systems other than those shown and described herein. Embodiments of the technology may be implemented in and used with various operating environments that include personal computers, server computers, handheld or laptop devices, multiprocessor systems, microprocessor-based systems, programmable consumer electronics, digital cameras, network PCs, minicomputers, mainframe computers, computing environments that include any of the above systems or devices, and so on. Moreover, the technology can be embodied in a special-purpose computer or data processor that is specifically programmed, configured or constructed to perform one or more of the computer-executable instructions described herein. Accordingly, the terms "computer" or "system" as generally used herein refer to any data processor and can include Internet appliances and handheld devices (including palmtop computers, wearable computers, cellular or mobile phones, multi-processor systems, processor-based or programmable consumer electronics, network computers, mini computers and the like). Information handled by these computers can be presented at any suitable display medium, including a CRT display or LCD.

The technology can also be practiced in distributed environments, where tasks or modules are performed by remote processing devices that are linked through a communications network. In a distributed computing environment, program modules or subroutines may be located in local and remote memory storage devices. Aspects of the technology described herein may be stored or distributed on computer-readable media, including magnetic or optically readable or removable computer disks, as well as distributed electronically over networks. Data structures and transmissions of data particular to aspects of the technology are also encompassed within the scope of the technology.

Figure 2:
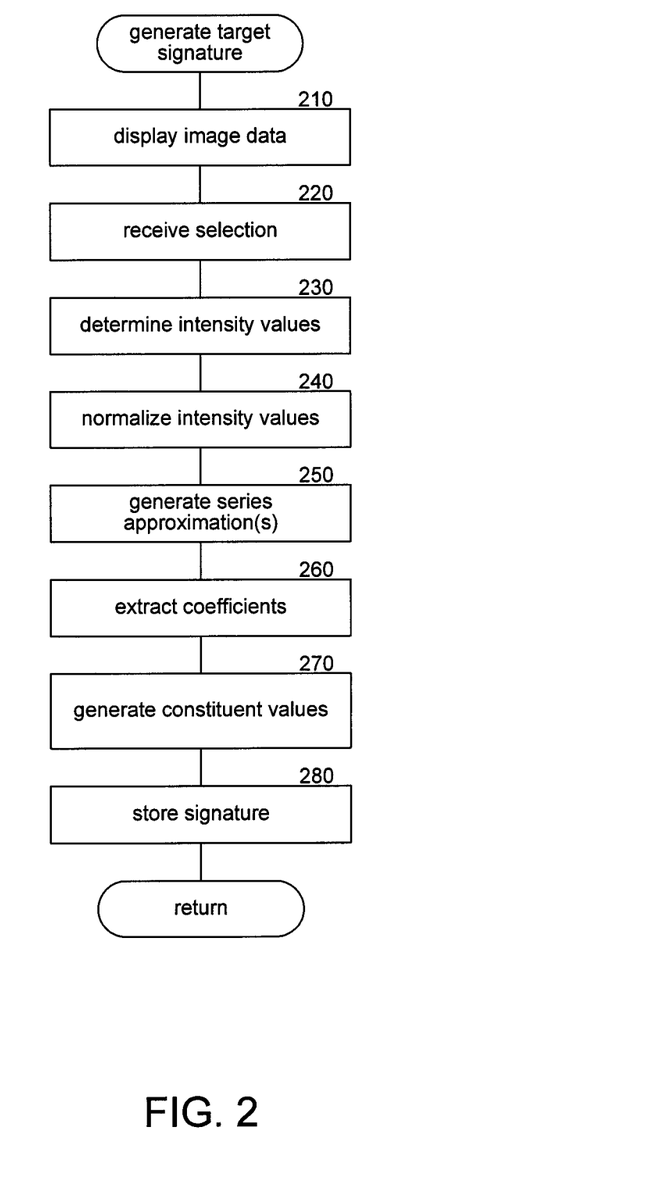
FIG. 2 is a block diagram illustrating the processing of a generate target signature component in accordance with an embodiment of the disclosed technology.

FIG. 2 is a block diagram illustrating the processing of a generate target signature component in accordance with an embodiment of the disclosed technology. The generate target signature component is invoked to generate a signature for a target of interest. In block 210, the component displays image data that includes the target of interest. In block 220, the component receives a selection of pixels that includes the target of interest. The selection may be received, for example, from a user using an input device (e.g., mouse) to draw a box or other shape around the target of interest in the displayed image data. In block 230, the component determines, for each of the selected pixels, one or more intensity values to be used in signature generation. The number of intensity values determined for each pixel may be dependent on the number of sensors or sensor channels available for each pixel. For example, if the captured image data includes red, green, and blue visible light data and infrared data the component may determine four intensity values for each pixel. In the same configuration, the component may determine an average RGB (red, green, blue) intensity value for the visible light sensor and combine this average intensity value with an intensity value from the infrared sensor for a total of two intensity values. In some cases, the user may determine which sets of data to use in generating the signature (e.g., red and infrared data; only the infrared data; or red, green, and blue data). In block 240, the component normalizes each set of intensity values. In some embodiments, the normalization is based at least in part on the mean and standard deviation of each set of intensity values. For example, each intensity value in a particular set of intensity values can be normalized by subtracting the mean value of that set of intensity values from the intensity value and dividing the difference by the standard deviation of the set of intensity values. In block 250, the component generates a series approximation for a probability distribution function corresponding to the normalized intensity values of the selected pixels. As discussed above, the series approximation may be generated using a truncated multivariate Gram-Charlier series according to:

$$f(\hat{\vec{X}}_n) \approx \sum_{s_1=o}^{k} \cdots \sum_{s_n=o}^{k} \left( E\left[\prod_{i=1}^{n} H_{s_i}(\hat{\vec{x}}_i)\right] \prod_{p=1}^{n} \frac{\left[H_{s_p}(\hat{\vec{x}}_p) \cdot G(\hat{\vec{x}}_p)\right]}{s_p!} \right),$$

where n represents the number of intensity values determined for each pixel (e.g., the number of sensors and/or sensor channels), $\hat{\vec{X}}_n$ represents the normalized intensity values and is comprised of n sub-vectors $(\hat{\vec{x}}_1, \hat{\vec{x}}_2, \ldots, \hat{\vec{x}}_3)$, each sub-vector representing a separate set of normalized intensity values (e.g., normalized intensity values for each sensor or sensor channel), E[ ] represents the Expected Value operator as applied to a given set of values, $H_j$ represents the $j^{th}$ Hermite polynomial, $$G(t) = \frac{1}{\sqrt{2\pi}} e^{-\frac{t^2}{2}},$$

and k represents the number of summations performed for each of the n sets of pixel data intensity values. For example, if two intensity values were determined for each pixel, the truncated multivariate Gram-Charlier series approximation may be generated according to:

$$f_k(\hat{\vec{x}}_1, \hat{\vec{x}}_2) \approx$$

$$\sum_{s_1=o}^{k} \sum_{s_2=o}^{k} \left( \frac{E\left[H_{s_1}(\hat{\vec{x}}_1) \bullet H_{s_2}(\hat{\vec{x}}_2)\right] \bullet H_{s_1}(\hat{\vec{x}}_1) \bullet G(\hat{\vec{x}}_1) \bullet H_{s_2}(\hat{\vec{x}}_2) \bullet G(\hat{\vec{x}}_2)}{s_1! s_2!} \right).$$

In block 260, the component extracts the coefficients generated by the series approximation. In block 270, the component generates constituent values for the signature. For example, the component may apply vector norms and/or determine the mean, the mode, the median, the variance, the standard deviation, the sum, or a checksum of the coefficients and/or the selected pixels. In some cases, the facility may combine coefficients generated from different truncated series approximations (e.g., approximations for different sensor or channels) into a single value, such as the mean or the sum of the mean and variance of all of the generated coefficients, to reduce the size of the signature. In block 280, the component stores the constituent values as the signature in addition to, or in association with, additional information related to the signature, such as an indication of a virtual range, weather conditions, time of day, date, surrounding conditions, and so on and then completes. In some cases, the component may use the selected pixels to generate multiple signatures for the target of interest, each signature derived from different combinations of pixel data (e.g., one signature generated solely from IR values, one signature generated from RGB values, one signature generated solely from red values, and so on) and constituent values. By generating different signatures, the facility can identify and track the target of interest within image data captured using different image capturing devices and in different conditions.

Figure 3:
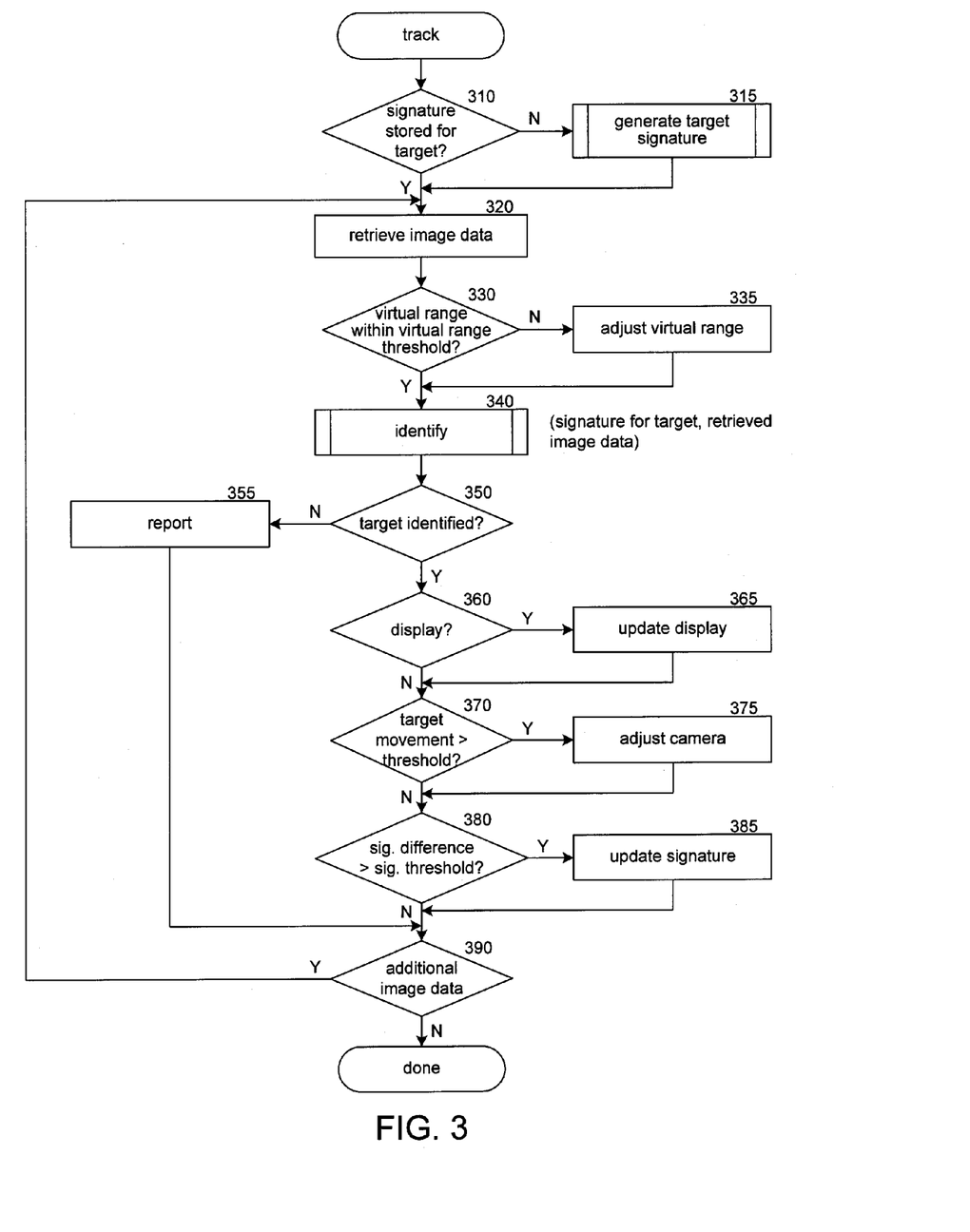
FIG. 3 is a block diagram illustrating the processing of a track component in accordance with an embodiment of the disclosed technology.

FIG. 3 is a block diagram illustrating the processing of a track component in accordance with an embodiment of the disclosed technology. The component is invoked to track a target of interest within captured image data. In decision block 310, if a signature for the target of interest is currently stored, then the component continues at block 320, else the component continues at block 315. For example, the component may prompt the user with a list of available signatures and ask the user to select an appropriate signature from among the list. The list may identify the target of interest and may include additional information about the signature, such as:

TABLE 1

| | Target of Interest | Date - Time | Sensors/ Channels | Weather | Virtual Range Data | Signature Patch Size (pixels) |
|---|---|---|---|---|---|---|
| A | Truck | 11/29 - 8:00 am | RGB | Overcast | Altitude: 3,000 ft<br>Distance to Target: 1,000 ft<br>Focal Length: 55 mm<br>Digital Zoom: 2x | 300 × 300 |
| B | Truck | 10/03 - 12:15 pm | RGB | Clear | Altitude: 13,000 ft<br>Focal Length: 950 mm | 150 × 125 |
| C | Nimitz-Class Supercarrier | 12/24 - 3:45 pm | RGB, IR | N/A | Altitude: 42,000 ft<br>Focal Length: 850 mm<br>Digital Zoom: 1x | 250 × 250 |
| D | Cow | 02/29 - 6:37 pm | BW, UV | Partially Cloudy | Distance to Target: 1,000 ft<br>Focal Length: 55 mm<br>Digital Zoom: 6x | 300 × 300 |
| E | Tank | 01/12 - 10:13 pm (Night Vision On) | RGB | N/A | Distance to Target: 300 ft<br>Focal Length: 35 mm<br>Digital Zoom: 12x | 175 × 175 |
| F | F/A-18 Hornet | 05/13 - 10:42 am | IR | Overcast | Altitude: 17,000 ft<br>Distance to Target: 1,000 ft<br>Focal Length: 255 mm<br>Digital Zoom: 10x | 140 × 280 |
| G | 1998 Ford F-150 | 04/23 - 3:34 am (Night Vision On) | RGB, IR, UV | Broken Clouds | Distance to Target: 1,000 ft<br>Focal Length: 415 mm<br>Digital Zoom: 5x | 80 × 200 |
| H | Cessna 152 | 09/19 - 8:38 am | IR | Clear | Altitude: 2,500 ft<br>Distance to Target: 1,000 ft<br>Focal Length: 55 mm<br>Digital Zoom: 5x | 400 × 200 |

TABLE 1-continued

| | Target of Interest | Date - Time | Sensors/ Channels | Weather | Virtual Range Data | Signature Patch Size (pixels) |
|---|---|---|---|---|---|---|
| I | 2012 Cigarette 42 Huntress | 07/31 - 5:34 pm | RGB, UV | Overcast | Focal Length: 80 mm | 300 pixel diameter (circle) |

In this manner, the user can select the appropriate signature based at least in part on the target of interest, time of year/day, available sensor data, and weather conditions, etc. For example, if the image data to be captured (or previously captured) include only IR data, the user may select a signature that includes IR sensor data. As another example, if a truck is to be tracked during the morning and under cloudy skies, then the user may select signature "A" (even if the conditions do not match exactly). If the user does not find any of the available signatures suitable, then the user may indicate that a signature is not currently stored. In block 315, the component invokes a generate target signature component to generate a signature for the target of interest. In block 320, the component retrieves image data, such as a frame of real-time (or near real-time) image data captured from an available camera or previously-captured image data retrieved from an image store. In decision block 330, if the virtual range used to capture the retrieved image data is within a virtual range threshold for the target signature, then the component continues at block 340, else the component continues at block 335. In block 335, the component adjusts the virtual range for retrieved image data by, for example, digitally or optically zooming in or out on the retrieved image data. If the retrieved image data is being processed in real-time, the component may also adjust the camera by adjusting the digital or optical zoom settings of the camera or moving the camera closer to or further from potential targets. For example, if the potential target is likely to be at a particular height or altitude (e.g., ground level, 500 ft, 25,000 ft) and the camera is affixed to, for example, an unmanned aerial vehicle (UAV), the component can instruct the UAV to adjust its altitude to adjust the virtual range of subsequently captured images. In block 340, the component invokes an identify component to identify the target of interest within the retrieved image data. In decision block 350, if the target of interest is identified in the retrieved image data, then the component continues at decision block 360, else the component continues at block 355. In block 355, the component reports that the target was not identified by, for example, alerting a user or flashing a "Target Lost" notification, and then continues at decision block 390. In decision block 360, if the retrieved image data is being displayed, then the component continues at block 365, else the component continues at decision block 370. In block 365, the component updates the displayed image data by, for example, highlighting the identified target in the displayed image data. In decision block 370, if the target has moved relative to the captured image data beyond a movement threshold, then the component continues at block 375, else the component continues at decision block 380. In block 375, the component adjusts the camera by, for example, panning or tilting the camera in the direction of the movement. As another example, the facility may request or instruct a vehicle to which the camera is attached (e.g., unmanned aerial vehicle, airplane, motor vehicle, boat) to change its position by moving closer to or further from a target of interest. The movement threshold allows the facility to keep the target of interest within a preferred area of the captured images (e.g., the center). A low movement threshold will keep the target in approximately the same area while a high movement threshold will allow the target to move or drift relative to the captured image data, even out of frame. In some cases, the component may determine the velocity of the target based at least in part on its change in position between two or more captured images. Based at least in part on the determined velocity, the facility may also adjust a scan and/or tilt rate associated with the camera and/or instruct a vehicle to which the camera is attached to adjust its velocity by, for example, changing its speed or direction. In some cases, the facility may use the determined velocity to distinguish between similar objects. For example, if a target of interest is first detected traveling north at 35 miles per hour and two similar objects are later detected in other images, with a first object traveling generally north at 35 miles per hour and the other object traveling generally east at 65 miles per hour, the facility may identify the first object as the target of interest based at least in part on the determined velocities. In decision block 380, if the difference between the target signature and the comparison signature exceeds a signature threshold, then the component continues at block 385, else the component continues at decision block 390. In block 385, the component updates the target signature by, for example, replacing the current target signature with the comparison signature or generating a new target signature using current pixel data. Updating the signature allows the facility to dynamically adapt to changes in scenery, such as lighting changes over the course of a day, changes in weather conditions, and so on. A low signature threshold will result in frequent updates while a high signature threshold will result in few or zero updates. In decision block 390, if there is additional image data, then the component loops back to block 320 to retrieve additional image data, such as the next available frame or a subsequent frame, else processing of the component completes.

Figure 4:
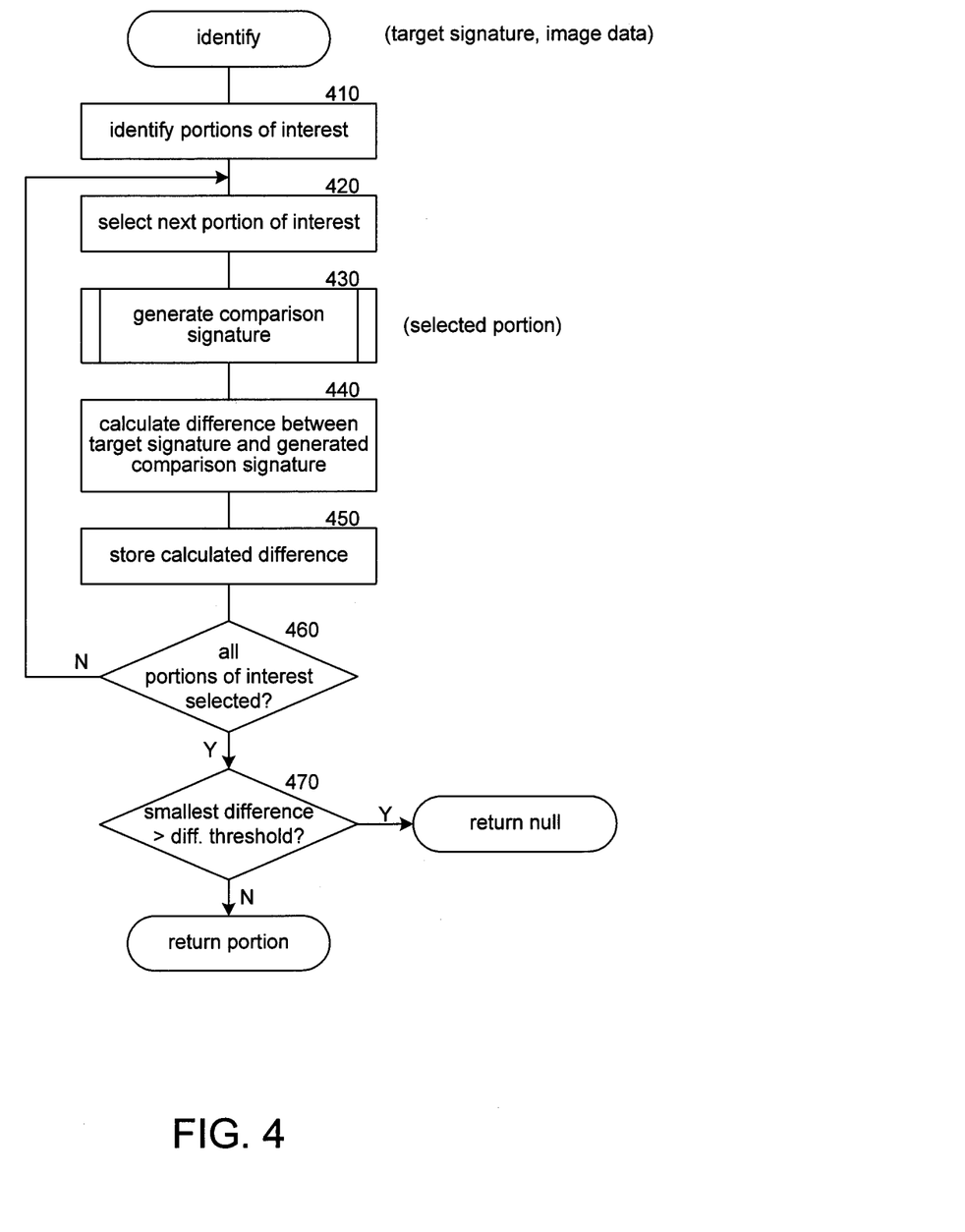
FIG. 4 is a block diagram illustrating the processing of an identify component in accordance with an embodiment of the disclosed technology.

FIG. 4 is a block diagram illustrating the processing of an identify component in accordance with an embodiment of the disclosed technology. The component is passed a target signature and image data and attempts to identify, within the image data, the target of interest corresponding to the received target signature. In block 410, the component identifies portions of interest corresponding to the locations within the image data where the component will search for the target of interest and may be based at least in part on, for example, where the target of interest was identified in an earlier image. The size of each portion of interest corresponds to the size of the target signature patch size (e.g., 300×300 pixels). In some cases, the component may identify all patches of the appropriate size as portions of interest. Alternatively, to conserve processing resources, the component may identify a limited number of portions of interest, such as one or more patches of pixels above (e.g., 1, 5, 10, 50 pixels) the location where the target was previously identified, one or more patches of pixels below the location where the target was previously identified, one or more patches of pixels to the left of the location where the target was previously identified, and one or more patches of pixels to the right of the location where the target was previously identified. In some cases the distance between the portions of interest and the previously identified location may be based at least in part on the length (I) and width (w) of the signature patch size (e.g., 0.2*length pixels to the left and right and 0.3*width pixels above and below). In block 420, the component selects a next portion of interest, starting with the first. In block 430, the component invokes a generate comparison signature component to generate a signature for the pixels of the selected portion of interest using the techniques and constituent parts used to generate the currently-used signature for the target of interest. In block 440, the component calculates the difference between the target signature and the generated comparison signature. If each of the signatures is stored as a vector of values (or sub-vectors), the difference can be determined by, for example, subtracting corresponding portions of the target signature from the comparison signature (e.g., $$\sum_i (\vec{S}_{COMP}[i] - \vec{S}_{TOI}[i])^2$$

where $\vec{S}_{COMP}[i]$ represents the $i^{th}$ component (including components of sub-vectors) of the comparison signature and $\vec{S}_{TOI}[i]$ represents the $i^{th}$ component (including components of sub-vectors) of the target signature. As another example, the component may calculate a distance between the two signatures such as $$\sqrt{\sum_i (\vec{S}_{COMP}[i] - \vec{S}_{TOI}[i])^2}.$$

In block 450, the component stores the calculated difference. In decision block 460, if all of the identified portions of interest have been selected, then the component continues at decision block 470, else the component loops back to block 420 to select the next portion of interest. In decision block 470, if the smallest calculated difference exceeds a difference threshold, then the component returns null, else the component returns an indication of the portion of interest having the smallest calculated difference.

Figure 5:
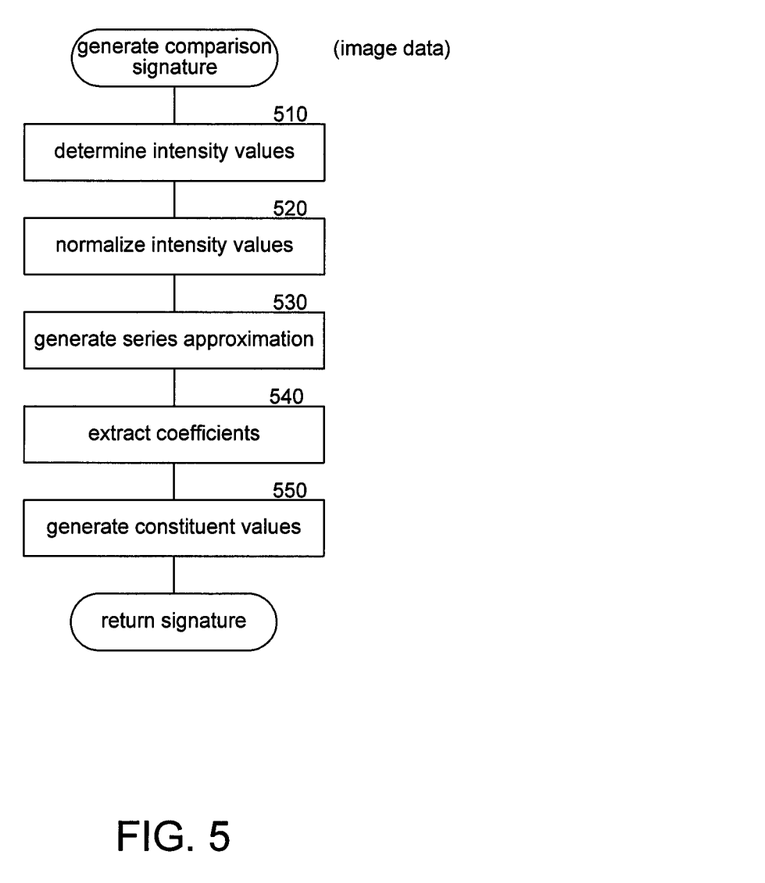
FIG. 5 is a block diagram illustrating the processing of a generate comparison signature component in accordance with an embodiment of the disclosed technology.

FIG. 5 is a block diagram illustrating the processing of a generate comparison signature component in accordance with an embodiment of the disclosed technology. The component is passed image data and is invoked to generate a signature for pixels of the image data that is compared to a target signature corresponding to a target of interest. In block 510, the component determines intensity values for the pixels of the image data. The intensity values determined are based at least in part on the intensity values used to generate the currently-used target signature for the target of interest. For example, if the target signature was generated using UV and IR data, the component determines UV and IR intensity values for the comparison signature. In block 520, the component normalizes the intensity values. In block 530, the component generates a series approximation for a probability distribution function based at least in part on the determined intensity values. In block 540, the component extracts the coefficients generated by the series approximation. In block 550 the component generates constituent values for the comparison signature. The generated constituent values correspond to the constituent values of the currently-used target signature (i.e., the signature to which the generated comparison signature will be compared) and then returns the comparison signature.

The techniques disclosed herein offer a way to 1) generate statistically signatures for different targets of interest, under different circumstances, and 2) use those signatures to acquire and verify target lock acquisition from frame to frame of visual data. These techniques do not rely on orientation or position of the target of interest relative to other objects in the visual data. Accordingly, the disclosed techniques can be used to identify and tracking targets of interest that may be found in different environments and in different orientations.

From the foregoing, it will be appreciated that specific embodiments of the technology have been described herein for purposes of illustration, but that various modifications may be made without deviating from the disclosure. The facility can include additional components or features, and/or different combinations of the components or features described herein. Additionally, while advantages associated with certain embodiments of the new technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

I claim:

1. A method, performed by a computing device having a memory and processor, for identifying targets of interest within captured image data, the method comprising:
    receiving, from a user, a selection of a first portion of a first frame of image data, the first portion of the first frame of image data including a target of interest;
    determining a characteristic value for each of a plurality of pixels within the selected first portion of the first frame of image data;
    generating a first series approximation for the characteristic values of the plurality of pixels within the selected first portion of the first frame of image data based on pixels only within the selected first portion of the first frame of image data;
    generating a target signature for the target of interest based at least in part on the generated first series approximation; and
    for each of a plurality of second portions of second frames of image data,
        determining a characteristic value for each of a plurality of pixels within the second portion of the second frame of image data,
        generating a second series approximation for the characteristic values of the plurality of pixels within the second portion of the second frame of image data,
        generating a comparison signature for the second portion of the second frame of image data based at least in part on the generated second series approximation, and
        determining a difference between the target signature and the comparison signature generated for the second portion of the second frame of image data.

2. The method of claim 1, further comprising:
    identifying the second portion of the second frame of image data associated with the comparison signature having the smallest determined difference between the target signature; and
    indicating that the identified second portion of the second frame of image data includes the target of interest.

3. The method of claim 1, further comprising:
determining a first mean value for at least a portion of the determined characteristic values of the plurality of pixels within the selected first portion of the first frame of image data; and
determining a first variance value for at least a portion of the determined characteristic values for the plurality of pixels within the selected first portion of the first frame of image data,
wherein generating the target signature is further based at least in part on the determined first mean value and the determined first variance value.

4. The method of claim 3, further comprising:
for each of the plurality of second portions of second frames of image data,
determining a second mean value for at least a portion of the determined characteristic values of the plurality of pixels within the second portion of the second frame of image data, and
determining a second variance value for at least a portion of the determined characteristic values of the plurality of pixels within the second portion of the second frame of image data,
wherein generating the comparison signature is further based at least in part on the determined second mean value and the determined second variance value.

5. The method of claim 1, further comprising:
normalizing at least a portion of the determined characteristic values of the plurality of pixels within the selected first portion of the first frame of image data, wherein generating the first series approximation for the characteristic values of the plurality of pixels within the selected first portion of the first frame of image data comprises generating the first series approximation based at least in part on the normalized portion of the determined characteristic values of the plurality of pixels within the selected first portion of the first frame of image data.

6. The method of claim 5, further comprising:
for each of the plurality of second portions of second frames of image data,
normalizing at least a portion of the determined characteristic values of the plurality of pixels within the second portion of the second frame of image data, wherein generating the second series approximation for the characteristic values of the plurality of pixels within the second portion of the second frame of image data comprises generating the second series approximation based at least in part on the normalized portion of the determined characteristic values of the plurality of pixels within the second portion of the second frame of image data.

7. A method, performed by a computing device having a memory and processor, for identifying targets of interest within captured image data, the method comprising:
receiving, from a user, a selection of a first portion of a first frame of image data, the first portion of the first frame of image data including a target of interest;
determining a characteristic value for each of a plurality of pixels within the selected first portion of the first frame of image data;
generating a first series approximation for the characteristic values of the plurality of pixels within the selected first portion of the first frame of image data;
generating a target signature based at least in part on the generated first series approximation; and for each of a plurality of second portions of second frames of image data,
determining a characteristic value for each of a plurality of pixels within the second portion of the second frame of image data,
generating a second series approximation for the characteristic values of the plurality of pixels within the second portion of the second frame of image data,
generating a comparison signature for the second portion of the second frame of image data based at least in part on the generated second series approximation, and
determining a difference between the target signature and the comparison signature generated for the second portion of the second frame of image data,
normalizing at least a portion of the determined characteristic values of the plurality of pixels within the selected first portion of the first frame of image data, wherein generating the first series approximation for the characteristic values of the plurality of pixels within the selected first portion of the first frame of image data comprises generating the first series approximation based at least in part on the normalized portion of the determined characteristic values of the plurality of pixels within the selected first portion of the first frame of image data,
wherein the target signature, $\vec{S}$, is represented as $$\vec{S} = [(L^1\{f(\text{coeff}(\vec{X}_{norm}))\} + L^2\{f(\text{coeff}(\vec{X}_{norm}))\}), E[\vec{X}], E[\vec{X}^2] - (E[\vec{X}])^2],$$

wherein $\vec{X}_{norm}$ represents the normalized characteristic values of the plurality of pixels within the selected first portion of the first frame of image data, wherein $\text{coeff}(f(\vec{X}))$ represents coefficients of a series approximation, and wherein $\vec{X}$ represents the characteristic values of the plurality of pixels within the selected first portion of the first frame of image data.

8. The method of claim 1, further comprising:
determining a first vector norm based at least in part on the generated first series approximation; and
determining a second vector norm based at least in part on the generated first series approximation,
wherein generating the target signature is further based at least in part on the determined first vector norm and the determined second vector norm.

9. The method of claim 8, further comprising:
for each of the plurality of second portions of second frames of image data,
determining a third vector norm based at least in part on the generated second series approximation,
determining a fourth vector norm based at least in part on the generated second series approximation,
wherein generating the comparison signature is further based at least in part on the determined third vector norm and the determined fourth vector norm.

10. The method of claim 1, further comprising:
highlighting the identified second portion of the second frame of image data.

11. The method of claim 1, wherein the characteristic values are intensity values.

12. A method, performed by a computing device having a memory and processor, for identifying targets of interest within captured image data, the method comprising:
receiving, from a user, a selection of a first portion of a first frame of image data, the first portion of the first frame of image data including a target of interest;

determining a characteristic value for each of a plurality of pixels within the selected first portion of the first frame of image data;

generating a first series approximation for the characteristic values of the plurality of pixels within the selected first portion of the first frame of image data;

generating a target signature based at least in part on the generated first series approximation; and for each of a plurality of second portions of second frames of image data,     determining a characteristic value for each of a plurality of pixels within the second portion of the second frame of image data,     generating a second series approximation for the characteristic values of the plurality of pixels within the second portion of the second frame of image data,     generating a comparison signature for the second portion of the second frame of image data based at least in part on the generated second series approximation, and determining a difference between the target signature and the comparison signature generated for the second portion of the second frame of image data, wherein the first series approximation is generated based at least in part on $$f(\vec{X}_n) = \sum_{s_1=0}^{\infty} \cdots \sum_{s_n=0}^{\infty} \left( E\left[\prod_{i=1}^{n} H_{s_i}(\vec{x}_i)\right] \prod_{p=1}^{n} \frac{[H_{s_p}(\vec{x}_p) \bullet G(\vec{x}_p)]}{s_p!} \right),$$

wherein $\vec{X}_n = (\vec{x}_1, \vec{x}_2, \ldots, \vec{x}_n)$ and represents normalized characteristic values, wherein $$G(t) = \frac{1}{\sqrt{2\pi}} e^{-\frac{t^2}{2}},$$

and wherein $H_i$ represents the $i^{th}$ Hermite polynomial.

13. A method, performed by a computing device having a memory and processor, for identifying targets of interest within captured image data, the method comprising:

receiving, from a user, a selection of a first portion of a first frame of image data, the first portion of the first frame of image data including a target of interest;

determining a characteristic value for each of a plurality of pixels within the selected first portion of the first frame of image data;

generating a first series approximation for the characteristic values of the plurality of pixels within the selected first portion of the first frame of image data;

generating a target signature based at least in part on the generated first series approximation; and for each of a plurality of second portions of second frames of image data,     determining a characteristic value for each of a plurality of pixels within the second portion of the second frame of image data,     generating a second series approximation for the characteristic values of the plurality of pixels within the second portion of the second frame of image data,     generating a comparison signature for the second portion of the second frame of image data based at least in part on the generated second series approximation, and determining a difference between the target signature and the comparison signature generated for the second portion of the second frame of image data, wherein the first series approximation is generated based at least in part on $$f(\vec{x}_1, \vec{x}_2) = \sum_{s_1=0}^{\infty} \sum_{s_2=0}^{\infty} \left( \frac{E[H_{s_1}(\vec{x}_1) \bullet H_{s_2}(\vec{x}_2)] \bullet H_{s_1}(\vec{x}_1) \bullet G(\vec{x}_1) \bullet H_{s_2}(\vec{x}_2) \bullet G(\vec{x}_2)}{s_1! s_2!} \right)$$

wherein $\vec{x}_1$ represents normalized characteristic values received from a first sensor, wherein $\vec{x}_2$ represents normalized characteristic values received from a second sensor, wherein $$G(t) = \frac{1}{\sqrt{2\pi}} e^{-\frac{t^2}{2}},$$

and wherein $H_j$ represents the $j^{th}$ Hermite polynomial.

14. The method of claim 1, further comprising:

generating a plurality of target signatures for the target of interest; and in response to determining that the target of interest is to be detected,     identifying the plurality of target signatures,     prompting a user to select from among the plurality of target signatures, and     comparing the selected target signature to each of a plurality of generated comparison signatures.

15. A computer-readable medium, that is not a transitory propagating signal, storing instructions that, when executed by a computing device having a processor, cause the computing device to perform operations comprising:

receiving, from a user, a selection of a first portion of a first frame of image data, the first portion of the first frame of image data including a target of interest;

determining a first probability density function based at least in part on characteristic values of a plurality of pixels within the selected first portion of the first frame of image data;

generating a first signature for the target of interest based at least in part on the first probability density function using a truncated multivariate Gram-Charlier series; and for a second frame of image data,     for each of a plurality of second portions of the second frame of image data,         determining a second probability density function based at least in part on characteristic values of a plurality of pixels within the second portion of the second frame of image data,         generating a second signature based at least in part on the second probability density function, and         determining a difference between the second signature and the first signature.

16. The computer-readable medium of claim 15, the operations further comprising:

identifying the second portion of the second frame of image data having the smallest difference between its second signature and the first signature; and indicating that the identified second portion of the second frame of image data includes the target of interest.

17. The computer-readable medium of claim 16, the operations further comprising:
   determining whether the smallest difference is greater than a signature threshold; and
   in response to determining that the smallest difference is greater than a signature threshold, updating the first signature.

18. The computer-readable medium of claim 15, the operations further comprising:
   generating a series approximation to the first probability density function, wherein the first signature for the target of interest is based at least in part on the coefficients of the generated series approximation.

19. The computer-readable medium of claim 15, wherein the first signature is based at least in part on data collected from at least two of a visible light camera, a thermographic camera, or an ultraviolet camera.

20. The computer-readable medium of claim 15, wherein the characteristic values are intensity values.

21. A method, performed by a computing device having a memory and processor, for identifying targets of interest within captured image data, the method comprising:
   determining a characteristic value for each of a plurality of pixels within a first patch of pixels only within a first image;
   generating a first series approximation based on values for the first patch of pixels only within the first image;
   generating a target signature based at least in part on the generated first series approximation;
   for each of a plurality of patches of pixels within a second image,
      generating a second series approximation based at least in part on values for pixels within the patch,
      generating a comparison signature based at least in part on the generated second series approximation, and
      determining a distance between the comparison signature and the target signature;
   identifying the patch of pixels associated with the comparison signature having the smallest determined distance between the target signature as including the target of interest.

22. A computer-readable medium, that is not a transitory propagating signal, storing instructions that, when executed by a computing device having a processor, cause the computing device to perform operations comprising:
   determining a characteristic value for each of a plurality of pixels within a first patch of pixels only within a first image;
   generating a first series approximation based on values for the first patch of pixels only within the first image;
   generating a target signature based at least in part on the generated first series approximation;
   for each of a plurality of patches of pixels within a second image,
      generating a second series approximation based at least in part on values for pixels within the patch,
      generating a comparison signature based at least in part on the generated second series approximation, and
      determining a distance between the comparison signature and the target signature; and
   identifying the patch of pixels associated with the comparison signature having the smallest determined distance between the target signature as including the target of interest.

* * * * *